United States Patent
Howell et al.

[11] Patent Number: 6,161,847
[45] Date of Patent: Dec. 19, 2000

[54] PUSH N' PEDAL N' ROCK TRIKE

[75] Inventors: William R. Howell; Kurt J. Huntsberger, both of Chaffee, N.Y.

[73] Assignee: Mattel, Inc., El Segundo, Calif.

[21] Appl. No.: 09/302,996

[22] Filed: Apr. 30, 1999

[51] Int. Cl.[7] .................................................. B60F 57/00
[52] U.S. Cl. ........................ 280/30; 280/7.17; 280/282; 280/295; 297/272.1
[58] Field of Search .................................. 297/272.1, 118, 297/133; 280/282, 293, 294, 295, 301, 7.12, 7.15, 7.17, 30, 62, 7.1, 9

[56] References Cited

U.S. PATENT DOCUMENTS

| | | |
|---|---|---|
| 256,390 | 4/1882 | Shepardson . |
| 967,641 | 8/1910 | Joseph . |
| 1,467,908 | 9/1923 | Perrigo . |
| 1,481,650 | 1/1924 | Murphy . |
| 2,176,832 | 10/1939 | Allen .......................................... 155/22 |
| 2,497,265 | 2/1950 | Leit et al. ................................. 46/106 |
| 2,499,531 | 3/1950 | Sever ...................................... 280/7.17 |
| 2,541,327 | 2/1951 | Billinghurst .............................. 155/73 |
| 2,605,812 | 8/1952 | Benze . |
| 2,716,439 | 8/1955 | Feist ......................................... 155/73 |
| 2,754,120 | 7/1956 | Green ..................................... 272/52.5 |
| 3,010,731 | 11/1961 | Kenney . |
| 3,161,417 | 12/1964 | Goldfarb ................................. 280/7.1 |
| 3,269,771 | 8/1966 | Erdos ....................................... 297/132 |
| 3,659,865 | 5/1972 | Nothacker ................................ 280/7.1 |
| 4,118,046 | 10/1978 | Vaughan .................................. 280/289 |
| 4,958,842 | 9/1990 | Chang ...................................... 280/7.1 |
| 5,022,667 | 6/1991 | Gillson ................................. 280/1.188 |
| 5,476,282 | 12/1995 | Dahl ........................................ 280/651 |
| 5,503,411 | 4/1996 | Sundberg et al. .................... 280/1.188 |

FOREIGN PATENT DOCUMENTS 2051607   1/1990   China .

*Primary Examiner*—Brian L. Johnson
*Assistant Examiner*—Avraham H. Lerner
*Attorney, Agent, or Firm*—Morgan, Lewis & Bockius LLP

[57] ABSTRACT

A child's ride-on toy has a rear mounted parent assist handle and is convertible to a child's rocker toy by rotating the handle about a rear axle to a position beneath the ride-on toy to serve as rocker rails. The handle can also be removed. The combination rocker and tricycle may thus be used either as a child's riding vehicle (with or without a parent-assist handle) or as a stationary rocker toy. As a child's tricycle, the handle is locked in an upright position extending rearwardly from the rear axle of the tricycle and positioned at a height convenient for a parent to control the motion of the tricycle. When the parent assist handle is no longer required it can be removed. To convert to a child's rocker the handle is rotated about the rear axle and positioned beneath the tricycle so that the handle portions support the tricycle.

12 Claims, 5 Drawing Sheets

PUSH N' PEDAL N' ROCK TRIKE

BACKGROUND OF THE INVENTION

Field of the Invention

The present invention relates to a combination rocking and riding toy for children having a parent assist handle. More particularly, the present invention is directed to a combination toy that includes a tricycle having a parent assist handle that can be rotated underneath the tricycle to form a rocking base when the combination toy is used as a rocking toy.

Background of the Invention

Rocking type toys for children have been known for many years. One of the more notable of these toys is the "hobby horse" that includes a toy horse mounted on rockers. Improvements have been made in the field to increase the versatility of rocking toys to maintain a child's interest in these toys over a longer period of time. For example, rocking toys have been developed that are convertible from a rocking toy to a toy that can be rolled across the ground or floor.

Rocker-tricycle combination toys are also known in the art. U.S. Pat. No. 5,503,411 shows a rocker-tricycle combination having features that include a rocking base, a support located on the base, and a tricycle detachably connected to the base through the support. The rocking base has a curved base plate that allows a rocking motion. A child can sit on the tricycle and rock back and forth when the tricycle is attached to the base. Further, the tricycle detaches from the base for use as a conventional tricycle.

U.S. Pat. No. 5,558,348 discloses a children's tricycle having a parent control handle secured to the rear of the tricycle by a threaded socket.

U.S. Pat. No. 3,659,865 describes a child's car seat that can be reconfigured for a variety of uses, including a four wheeled vehicle and rocker by using universally fitting parts which include a guide rod that serves as both a control handle and a rocker rail.

None of the conventional combination toys provide features that allow for quick, simple and easy reconfiguration between a rocking mode toy, a tricycle, and a tricycle having a parent assist handle.

SUMMARY OF THE INVENTION

An object of the present invention is to provide a combination toy that can be readily and easily converted between a child's riding vehicle (with or without a parent-assist handle) and a stationary rocker toy.

According to a preferred embodiment of the invention, one configuration of the combination toy is a children's tricycle having a parent assist handle that can be locked in an upright position. The parent assist handle extends rearwardly from the rear axle of the trike and is positioned at a height convenient for a parent to control the motion of the trike. When the parent assist handle is no longer required it can be easily removed. In a second configuration the combination toy can be converted to a child's rocker by rotating the parent assist handle about the rear axle and positioning the handle beneath the tricycle so that the handle portions support the tricycle. The extended handle portions are curved so that when positioned beneath the vehicle, the handle acts as rocker rails.

The invention is a ride-on toy having a body, with a body including a seat for supporting the child, an axle frame, and an axle rotatably supported in the axle frame. At least two wheels are supported on a rear axle of the ride-on toy. An elongated member is pivotally supported on the rear axle frame for movement between a first substantially upright position where the elongated member can be grasped as a handle and a second substantially horizontal position extending underneath the wheels where the elongated member provides a rocking mount for the ride-on toy.

The elongated member includes two substantially parallel arms, with each arm having a concave axle frame-interfacing surface at one end. The axle frame is received between the concave axle frame-interfacing surfaces and mating caps. The elongated member is free to rotate around the axle frame when the mating caps are connected to the concave axle frame-interfacing surfaces at the ends of the arms.

The ride-on toy includes a body that is in the shape of a tricycle and the rear axle frame that includes two portions extending in opposite directions on opposite sides of the seat. Each of the arms that make up the elongated member engage with one of the axle frame portions and are supported relative to the axle frame portion by one of the mating caps.

The elongated member can also include a pair of retainers that extended upwardly from the elongated member on opposite sides of a front wheel of the body when the elongated member is rotated into the substantially horizontal position underneath the wheels for use as a rocking mount for the ride-on toy.

Numerous other objects and features of the invention should become apparent upon a reading of the following detailed description taken in conjunction with the accompanying drawings.

BRIEF DESCRIPTION OF THE DRAWINGS

Embodiments of the invention will now be described, by way of example, with reference to the accompanying drawings in which.

DETAILED DESCRIPTION OF THE PREFERRED EMBODIMENTS

Figure 5:
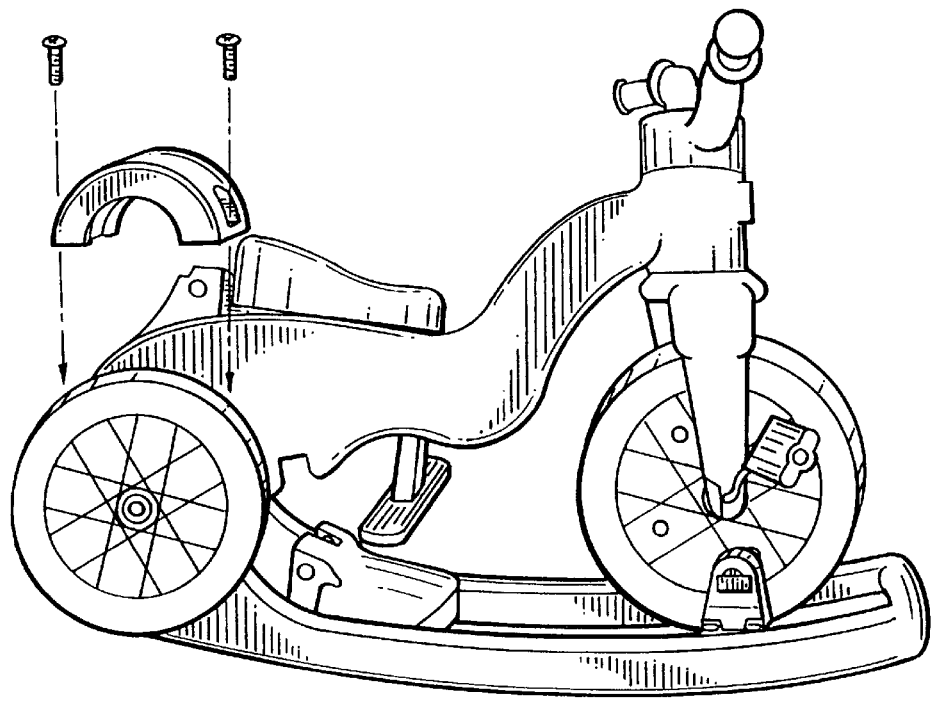
FIG. 5 is a perspective view of the combination toy shown in FIG. 1 showing a handle cap being positioned relative to the rear axle housing and the parent assist handle when the parent assist handle is positioned underneath the toy.
Figure 6:
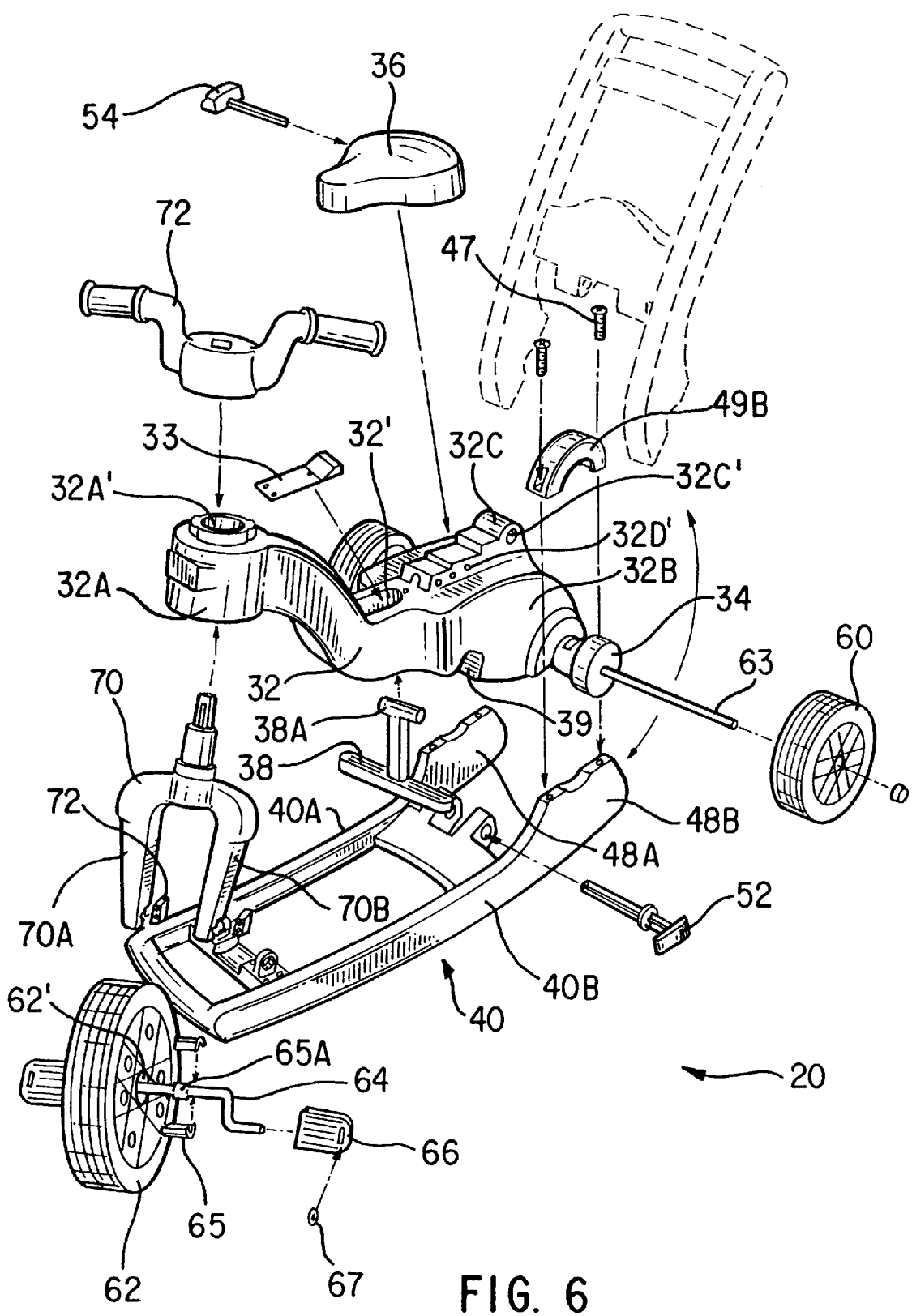
FIG. 6 is an exploded perspective view showing the various components of the toy shown in FIG. 1 and showing two positions of the parent assist handle relative to the rest of the toy.

A ride-on toy embodying the principles of the invention is illustrated in FIGS. 1, 2, 5, 6 and 7. The combination toy 20 is in the form of a tricycle having a parent assist handle that can be rotated underneath the tricycle to serve as a rocking base for the tricycle. As best seen in FIG. 6, the toy 20 includes a main body 32, the parent assist handle 40, a front fork 70, wheels 60, 62, handle bars 72 and a seat 36. A foot rest 38 can also be pivotally mounted to the underside of body 32 for rotation between a downwardly extending position at which a child's feet can be placed on the foot rest while using the toy as a rocker, and an upward position with the foot rest 38 being snapped into a recess 39 in the body 32 when the child's feet are placed on pedals 66 mounted on front axle 64.

The rear portion 32B of body 32 includes two outwardly extending axle housings 34. In a preferred embodiment the rear axle housings 34 are molded integrally with the body 32. Rear axle 63 is rotatably supported in rear axle housings 34. Rear wheels 60 are fixed on the ends of the rear axle 63.

The front end 32A of body 32 is provided with a substantially vertical opening 32A' through which the top end of a fork 70 is inserted. Handle bars 72 are engaged with the top end of the fork 70. The lower bifurcated end of fork 70 includes two spaced arms 70A and 70B. Arms 70A and 70B are connected to front axle 64 by fork covers 72 that engage with the lower ends of arms 70A and 70B on opposite sides of the front wheel 62.

The foot rest 38 is pivotally mounted to body 32 with the top end 38A of the foot rest 38 being inserted into a central opening 32' of body 32 and held in position by a cover 33.

The seat 36 is positioned on body 32 and held in place by a seat retainer pin 54. The seat retainer pin 54 is inserted through a side of the seat 36 and through one of several spaced transverse holes 32D' at the top of rear body portion 32B.

Figure 2:
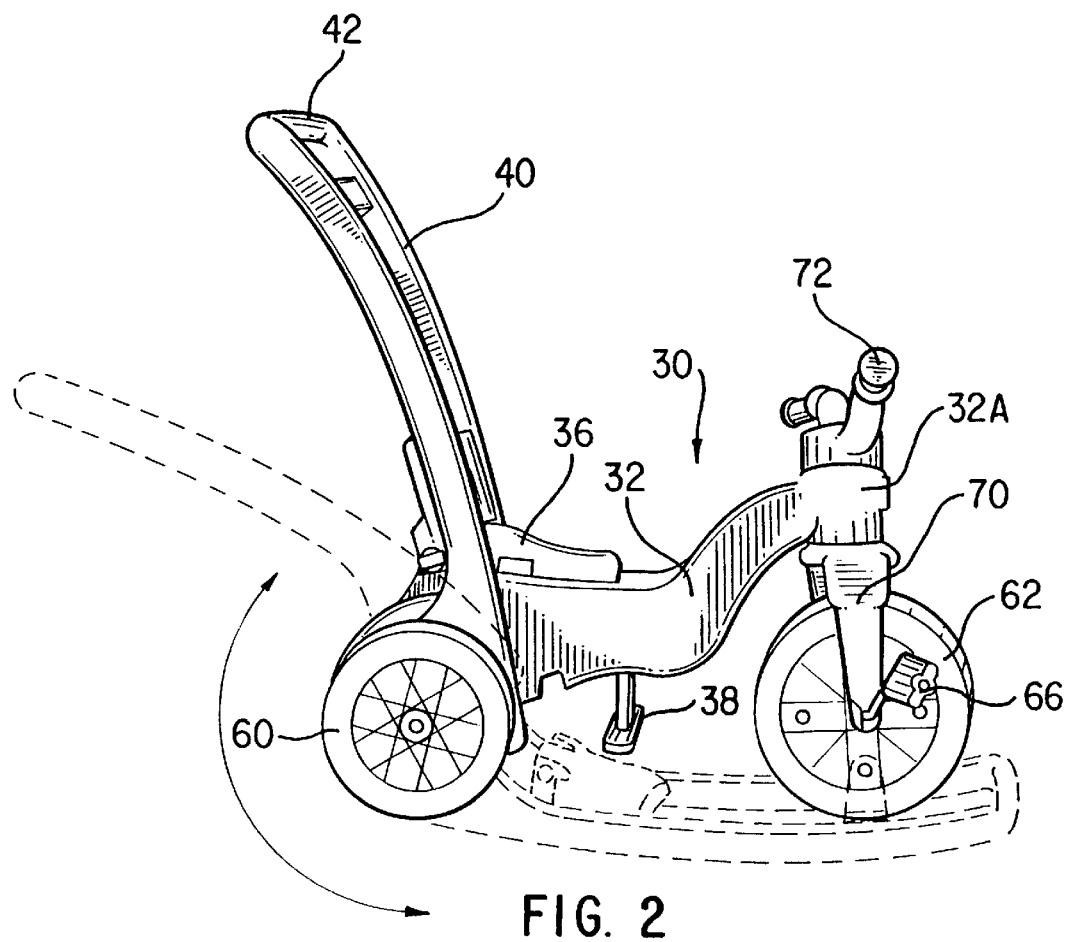
FIG. 2 is a perspective view of the combination toy shown in FIG. 1, and showing in phantom two positions of the parent assist handle after a handle pin has been removed.
Figure 3:
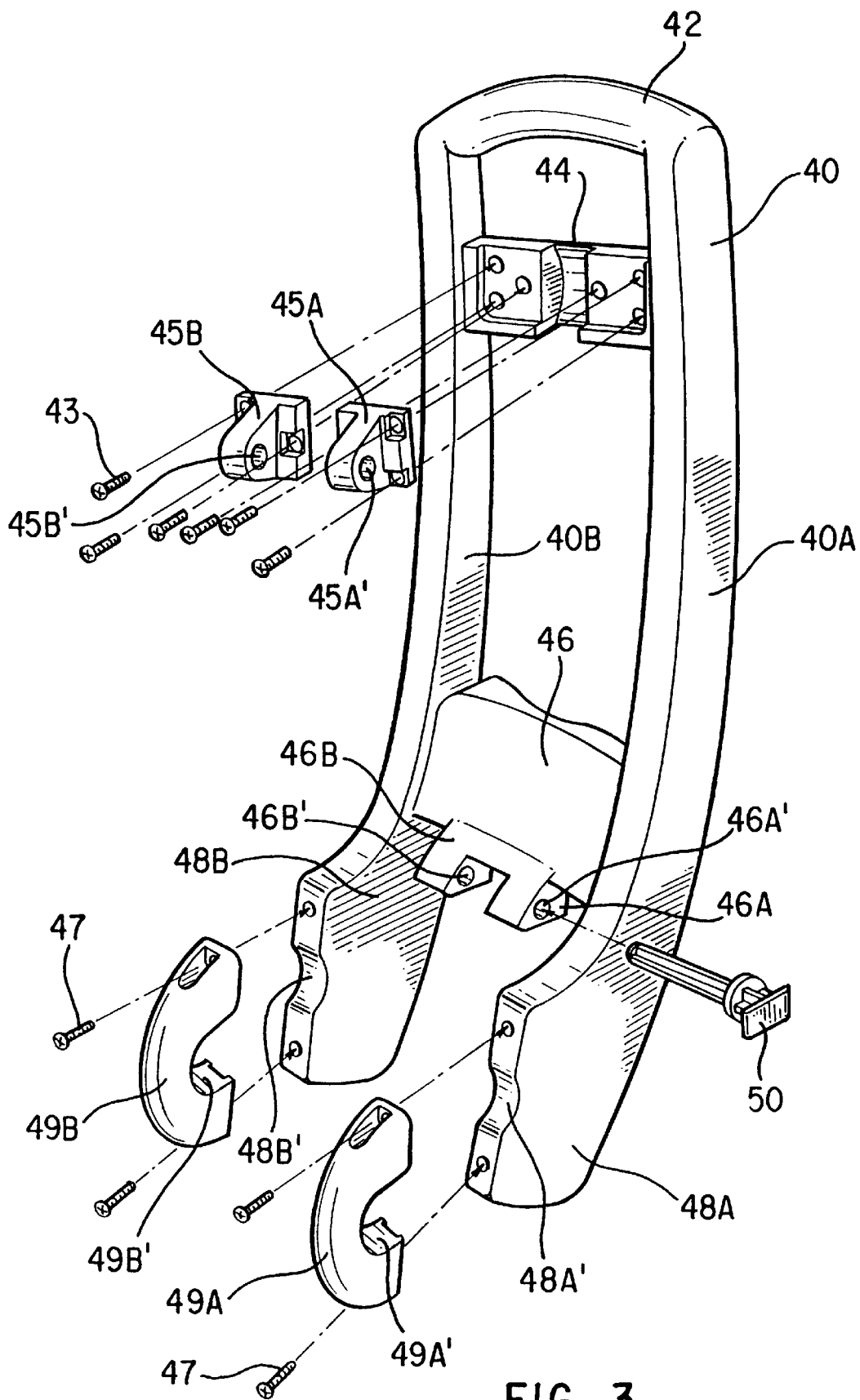
FIG. 3 is an exploded perspective view showing the parent assist handle from the combination toy shown in FIG. 1 with handle caps removed from one end of the parent assist handle and front wheel retainers removed from the other end of the parent assist handle.

As best seen in FIG. 3, the parent assist handle 40 includes two substantially parallel arms 40A and 40B connected at one end by a transverse gripping member 42 and by additional transverse members 44 and 46 spaced along the length of arms 40A and 40B. Arms 40A and 40B are curved along their lengths so that they can act as a rocking base for the combination toy, as will be explained further below. Referring to FIG. 2, the solid outline of parent assist handle 40 shows the handle in a substantially vertical position with grasping portion 42 at a convenient height to be held by an adult. The dashed outlines of the handle 40 illustrate an intermediate position of the handle 40 as it is rotated from the substantially vertical position and a substantially horizontal position for the handle 40 when it is positioned underneath the toy 20 to act as a rocking base.

As best seen in the exploded view of FIG. 6, the arms 40A and 40B of handle 40 are connected to the rear axle housings 34 on opposite sides of rear portion 32B of body 32. The ends 48A and 48B of arms 40A and 40B are provided with concave recesses 48A' and 48B' for engagement with the curved outer periphery of rear axle housings 34. Mating handle caps 49A and 49B are also provided with concave recesses 49A' and 49B', and mate with the ends of arms 40A and 40B on the opposite side of rear axle housing 34 to pivotally mount handle 40 to the rear axle housing 34. Fasteners 47 are passed through aligned openings in the handle caps 49A and 49B and ends 48A and 48B of handle 40.

Figure 4:
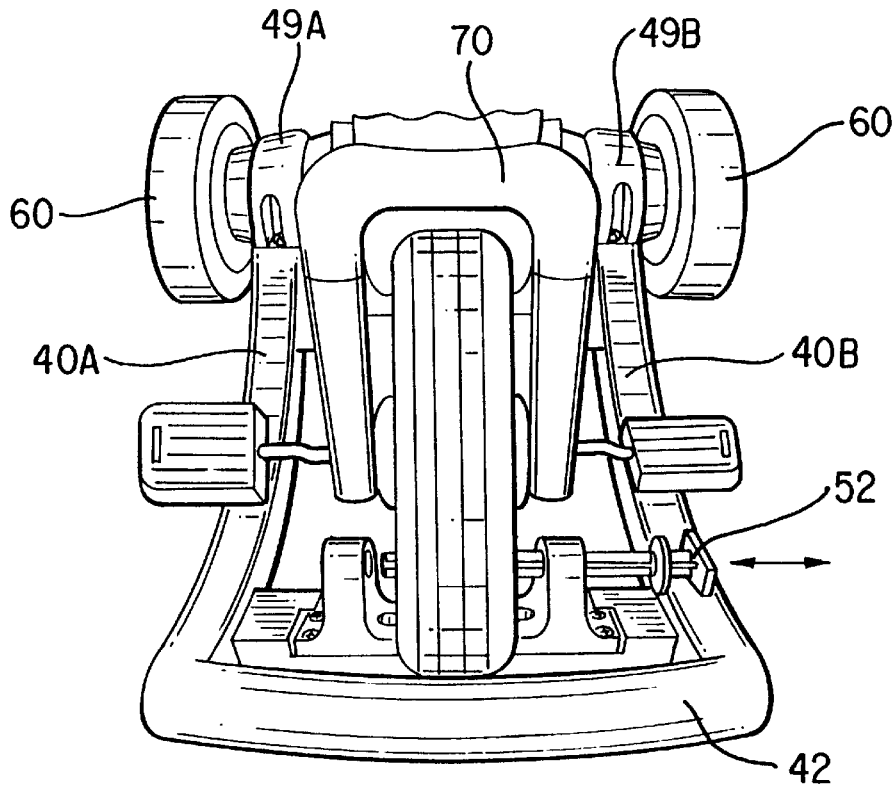
FIG. 4 is a perspective view of the combination toy shown in FIG. 1 showing a front wheel retaining pin being positioned relative to the front wheel of the toy and the front wheel retainers on the parent assist handle.

When handle 40 is positioned underneath the ride-on toy as shown in solid lines in FIGS. 5 and 6, front wheel retainers 45A and 45B extending upwardly from transverse member 44 are positioned on opposite sides of front wheel 62. As best seen in FIG. 4, a handle pin 52 can then be inserted through retainers 45A and 45B and through the front wheel 62 to retain the ride-on toy on the handle 40.

As shown in dashed lines in FIG. 2 and solid lines in FIG. 5, when the handle 40 is positioned underneath the ride-on toy, the convex curved surfaces of arms 40A and 40B are faced downwardly to act as a rocking base for the ride-on toy. As best seen in FIG. 4, when handle 40 is positioned underneath the ride-on toy to act as a rocking base, handle pin 52 is passed through retainers 45A and 45B and front wheel 62 to maintain the front wheel in position on the rocking base, and ends 48A and 48B of the arms 40A and 40B support the rear axle housings 34 such that rear wheels 60 are held off of the ground. As shown in FIG. 5, when the ride-on toy is in its rocking configuration, the foot rest 38 is rotated to a downwardly extending position to provide support for a child's feet when the child is seated in seat 36.

Figure 7:
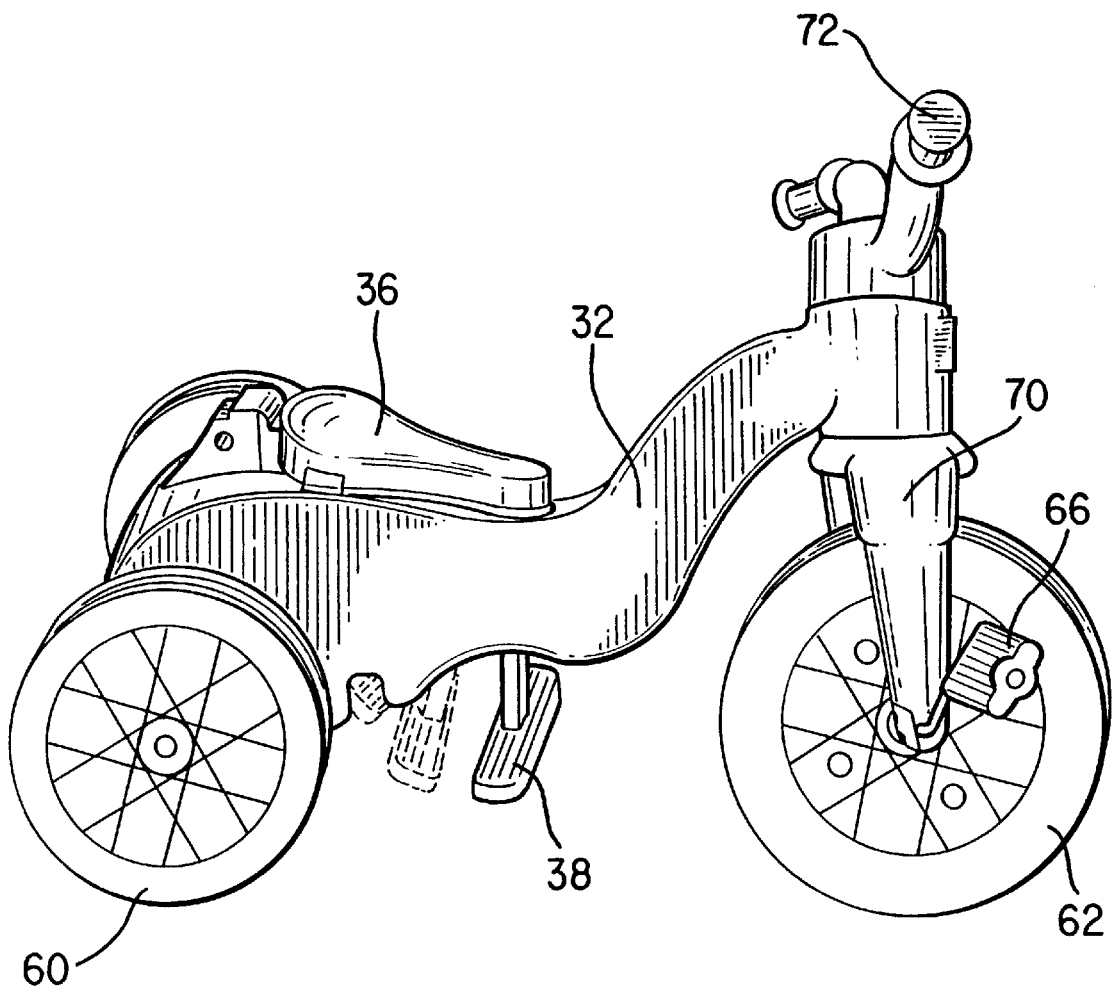
FIG. 7 is a perspective view of the combination toy of FIG. 1 with the parent assist handle removed.

If it is desired to use the ride-on toy as a tricycle without parent assist, as shown in FIG. 7, the handle caps 49A and 49B can be easily removed from handle 40 when it is in the rocking position by removal of fasteners 47 from ends 48A and 48B of arms 40A and 40B.

Figure 1:
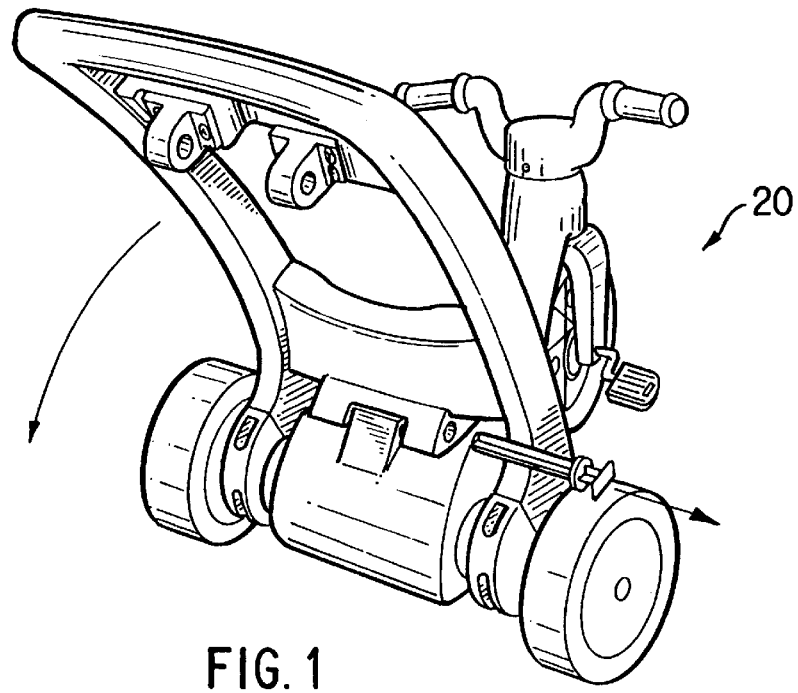
FIG. 1 is a perspective view of an embodiment of a tricycle/rocker combination according to the present invention.

If it is desired to use the ride-on toy as a tricycle having a parent assist handle, such as shown in FIG. 1, the handle pin 52 is simply removed from the front wheel 62 and front wheel retainers 45A and 45B, and handle 40 is rotated about rear axle housings 34 while lifting the ride-on toy 20 off of the ground until the handle 40 has been rotated to a substantially vertical position extending upwardly and rearwardly behind seat 36. Once the handle 40 has been rotated to its substantially vertical position it can be held in position by inserting the handle pin 52 through spaced lugs 46B and 46A extending rearwardly from transverse member 46. Holes 46A' and 46B' through lugs 46A and 46B are aligned with each other and with a transverse hole 32C' in an upwardly extending boss 32C of body 32. When the handle pin 52 is inserted through lugs 46A and 46B and through upwardly extending boss 32C on body 32, the handle 40 is held in position in its substantially vertical position with transverse grasping member 42 being positioned at a convenient height for control by an adult.

When the ride-on toy 20 is used as a tricycle, with or without the parent assist handle 40, the child's feet engage with pedals 66 that are retained on front axle 64 by lock washers 67. Axle covers 65 positioned on opposite sides of the front axle 64 engage metal tabs 65A on both sides of the front axle 64 and are press fit into a hole through the front wheel 62. When the ride-on toy is used as a tricycle, the foot rest 38 can be rotated up underneath body 32 until it snaps into position in groove 39.

It will be understood that various modifications and changes can be made in the configuration of the disclosed ride-on toy without departing from the scope or intent of the appended claims. As an example, the handle 40 could be fixed to the rear axle housings 34 with the rear axle housings 34 being rotatable relative to body 32. Additionally, the exact means by which the handle 40 is pivotally mounted relative to the rear axle can be varied.

What is claimed is:

1. A ride-on toy, comprising:
    a body, said body including a seat for supporting a child, an axle frame, an axle coaxial with and rotatably supported in said axle frame, and a plurality of wheels;
    at least two of said wheels being supported on said axle; and
    an elongated member being pivotally supported on said axle frame for movement between a first substantially upright position where said elongated member can be grasped as a handle and a second substantially horizontal position extending underneath said ride-on toy where said elongated member provides a rocking mount for the ride-on toy.

2. The ride-on toy according to claim 1, wherein said elongated member includes two substantially parallel arms, each having a concave axle frame-interfacing surface at one end;

said axle frame being received between said concave axle frame-interfacing surfaces and mating caps.

3. The ride-on toy according to claim 2, wherein said elongated member is free to rotate around said axle frame when said mating caps are connected to said concave axle frame-interfacing surfaces at the ends of said arms.

4. The ride-on toy according to claim 3, wherein said body is in the shape of a tricycle and said axle frame includes two portions extending in opposite directions on opposite sides of said seat, each of said arms engaging with one of said axle frame portions and being supported relative to said axle frame portion by one of said mating caps.

5. The ride-on toy according to claim 4, wherein said elongated member includes a pair of retainers that extend upwardly from said elongated member on opposite sides of a front wheel of said body when said elongated member is rotated to said second substantially horizontal position for use as a rocking mount for the ride-on toy.

6. The ride-on toy according to claim 5, wherein a pin is passed through each of said retainers and a hole through said front wheel to secure said front wheel to said elongated member when said elongated member is used as a rocking mount for said ride-on toy.

7. The ride-on toy according to claim 4, wherein a pin is passed through a portion of said body and through bosses extending from said elongated member when said elongated member is in said first, substantially upright position for maintaining said elongated member in said substantially upright position when said elongated member is grasped as a handle.

8. A rocker attachment for a child's ride-on toy having a plurality of wheels supported on front and rear axles, comprising:

an elongated curved member having a first and second ends, said first end having a grasping portion, said second end having engagement portions for pivotally connecting said rocker attachment to an axle housing supporting said rear axle; wherein said elongated curved member includes two substantially parallel arms, with each of said arms having a concave recess at said second end shaped to conform to an outer periphery of the axle housing, and a detachable cap for maintaining said member in pivotal relationship with the axle housing.

9. The rocker attachment according to claim 8, wherein an inner surface of each of said caps and a respective one of said concave recesses together conform to the outer periphery of the axle housing when the caps are fastened to the second ends of said arms with the axle housing being pivotally supported between the caps and the second ends.

10. The rocker attachment according to claim 9, wherein said elongated curved member includes a transverse member closer to said first end than said second end, with said transverse member having two spaced lugs projecting in a substantially perpendicular direction from said transverse member.

11. The rocker attachment according to claim 10, wherein said elongated member extends in a substantially vertical direction from the axle housing in a first position with the first end and said grasping portion being in a position above and behind a child positioned on said ride-on toy, and said elongated member extends in a substantially horizontal direction underneath said ride-on toy in a second position with the two spaced lugs being positioned on opposite sides of a wheel supported on the front axle and the elongated member being pivotable between said first and second positions.

12. The rocker attachment according to claim 11, wherein said elongated member is free to rotate about said axle housing when said caps are connected to the second ends of said arms.

* * * * *